United States Patent
Komazaki et al.

[11] Patent Number: 5,841,751
[45] Date of Patent: Nov. 24, 1998

[54] RECORDING-MEDIUM DRIVING APPARATUS AND RECORDING-MEDIUM DRIVING METHOD WITH PLAYBACK SIGNAL DEFECT DETECTOR

[75] Inventors: Takahiro Komazaki; Keiichi Tsutsui, both of Kanagawa, Japan

[73] Assignee: Sony Corporation, Tokyo, Japan

[21] Appl. No.: 859,459

[22] Filed: May 19, 1997

[30] Foreign Application Priority Data

May 22, 1996 [JP] Japan ................................ 8-126694

[51] Int. Cl.$^6$ ........................................... G11B 7/00
[52] U.S. Cl. .......................... 369/59; 369/54; 369/124
[58] Field of Search ..................... 369/124, 59, 44.34, 369/44.32, 54, 58, 13

[56] References Cited

U.S. PATENT DOCUMENTS

| | | | |
|---|---|---|---|
| 4,385,328 | 5/1983 | Tanaka | 360/67 |
| 4,924,447 | 5/1990 | Fuji et al. | 369/13 |
| 5,140,573 | 8/1992 | Ando | 369/44.34 |
| 5,396,477 | 3/1995 | Matsumoto et al. | 369/44.34 |
| 5,475,342 | 12/1995 | Nakamura et al. | 330/136 |

FOREIGN PATENT DOCUMENTS 2126723   5/1990   Japan .

*Primary Examiner*—Thang V. Tran
*Attorney, Agent, or Firm*—Frommer Lawrence & Haug, LLP; William S. Frommer

[57] ABSTRACT

When a signal is played back from an injured portion of an optical disk, immediately after the reproduction of the signal from the injured portion, a mirror signal can be obtained with a high degree of accuracy from conversion of a traverse signal into a binary signal. In a traverse-signal discriminating circuit, a traverse signal, a low-frequency component of a playback signal, is separated from the playback signal and then supplied a hold circuit. In the hold circuit, the bottom of the traverse signal is held in order to produce a bottom hold signal. In a defect detecting circuit, in the mean time, a defect in the playback signal, if any, is detected. If a defect is detected, the defect detecting circuit outputs a defect signal at an H level to a hold-voltage resetting circuit. The hold-voltage resetting circuit discharges a capacitor included in the hold circuit, halting the operation to hold the bottom of the traverse signal as long as the defect signal supplied thereto is set at the H level.

9 Claims, 9 Drawing Sheets

RECORDING-MEDIUM DRIVING APPARATUS AND RECORDING-MEDIUM DRIVING METHOD WITH PLAYBACK SIGNAL DEFECT DETECTOR

BACKGROUND OF THE INVENTION

1. Field of the Invention

In general, the present invention relates to a recording-medium driving apparatus and a recording-medium driving method. In particular, the present invention relates to a recording-medium driving apparatus and a recording-medium driving method used in an optical disk apparatus for recording and playing back information into and from typically an optical disk, which apparatus and method are capable of making an access to a desired track on the optical disk at a high speed.

2. Description of the Related Art

In an operation to play back information from an optical disk, for example, a mirror signal is generated from a reproduced signal in order, for example, to count the number of tracks crossed by a light radiated by an optical pickup and to carry out a pull-in operation of a tracking servo mechanism.

FIG. 6A is a diagram showing a cross section of an optical disk, that is, a cross section obtained by cutting the optical disk along a straight line passing the center of the disk in the radius direction. Let a light (or a light spot) radiated by an optical pickup cross a portion of the cross section comprising pits (or groups) and lands arranged alternately as shown in the figure (FIG. 6A). In this case, the light is reflected by the optical disk to produce a reflected light which is received as a playback signal (an RF signal) shown in FIG. 6B. The playback signal comprises a high-frequency component (or a modulation component) representing the pits and a low-frequency component representing the alternate arrangement of the pits and the lands. FIG. 6C is a diagram showing the low-frequency component which is referred to hereafter simply as a traverse signal for the sake of convenience.

The traverse signal can be detected out of (that is, separated from) the playback signal in typical ways described as follows. The traverse signal can be detected out of (that is, separated from) the playback signal shown in FIG. 6B by detecting the envelop of the playback signal. As an alternative, the traverse signal can be separated from the playback signal by an averaging technique through filtering by means of a low-pass filter. The traverse signal obtained by using such a predetermined means is converted into a binary signal typically by using a predetermined threshold value to produce a rectangular wave like the one shown in FIG. 6D. The rectangular wave is called a mirror signal. It is obvious from comparison of FIG. 6A with FIG. 6D that the mirror signal represents the arrangement of the pits and the lands.

Thus, the mirror signal can be used for, among other purposes, counting the number of tracks crossed by the light radiated by the optical pickup as described above and carrying out a pull-in operation of the tracking servo mechanism.

By the way, when the traverse signal is converted into a binary signal in order to produce a mirror signal that represents the arrangement of the pits and the lands with a high degree of accuracy like the one shown in FIG. 6D, it is necessary to always recognize the center value (or the direct-current component) of the traverse signal accurately even if the amplitude of the traverse signal fluctuates. In order to recognize the center value with a high degree of accuracy, the peak and the bottom of the traverse signal are held to produce a top hold signal and a bottom hold signal respectively as shown in FIG. 7. Then, the top hold signal is added to the bottom hold signal to give a sum which is divided by two to produce a center-value signal. The center-value signal which represents center values of the traverse signal follows changes in traverse-signal amplitude.

The center-value signal produced in the way described above is used to represent a variable threshold value, with which the traverse signal is compared in order to generate a mirror signal like the one shown in FIG. 6D accurately in synchronization with the traverse signal.

FIG. 8 is a diagram showing a typical configuration of a unit employed in an optical-disk apparatus which is relevant to the generation of the mirror signal described above. As shown in the figure, first of all, an object lens 2 converges (or focuses) a light such as a laser beam emitted by an optical pickup 3 on an information recording surface of an optical disk 1. In addition, the object lens 2 transmits a light resulting from reflection of the laser beam by the optical disk 1 to be received by the optical pickup 3. In this way, the optical pickup 3 emits a laser beam to the optical disk 1, receiving a light resulting from reflection of the laser beam by the optical disk 1. The reflected light is converted by the optical pickup 3 in an opto-electrical conversion process into an electrical signal serving as a playback signal (or an RF signal). The playback signal is supplied by the optical pickup 3 to a traverse-signal discriminating unit 4.

The traverse-signal discriminating unit 4 separates (or discriminates) a traverse signal from the playback signal supplied by the optical pickup 3 by means of the envelop detecting technique or a technique using a low-pass filter as described above. The traverse signal produced by the traverse-signal discriminating unit 4 is then supplied to hold circuits 5A and 5B as well as to a comparator 8. At the hold circuits 5A and 5B, peak and bottom values of the traverse signal are held to generate a top hold signal and a bottom hold signal respectively which are then supplied to an adder 6. The adder 6 adds the top hold signal to the bottom hold signal, supplying the sum to a multiplier 7. The multiplier 7 multiplies the sum output by the adder 6 by ½ to produce a center value of the traverse signal which are output to the comparator 8. The comparator 8 compares the traverse signal received from the traverse-signal discriminating unit 4 with the center value received from the multiplier 7. Typically, during a period in which the traverse signal is found equal to or greater than the center value, the comparator 8 outputs a signal at a H level. During a period in which the traverse signal is found smaller than the center value, on the other hand, the comparator 8 resets the output signal to an L level. In this way, the traverse signal is converted into a binary mirror signal.

In an optical-disk apparatus with a configuration described above, a laser beam emitted by the optical pickup 3 is radiated to the optical disk 1 by way of the object lens 2. At the optical disk 1, the laser beam is reflected and the reflected light is transmitted back to the optical pickup 3 through the object lens 2. The optical pickup 3 converts the reflected light coming from the optical disk 1 in an opto-electrical conversion process into an electrical signal. Serving as a playback signal, the electrical signal is output to the traverse-signal discriminating unit 4. In the traverse-signal discriminating unit 4, a traverse signal is separated from the playback signal supplied by the optical pickup 3 and output to the hold circuits 5A and 5B as well as to the comparator 8. At the hold circuits 5A and 5B, peak and bottom values of the traverse signal supplied by the traverse-signal discriminating unit 4 are held to generate a top hold signal and a bottom hold signal respectively which are then supplied to the adder 6. The adder 6 adds the top hold signal to the bottom hold signal, supplying the sum to the multiplier 7. The multiplier 7 multiplies the sum output by the adder 6 by ½ to produce a center value of the traverse signal which are output to the comparator 8. At the comparator 8, the traverse signal supplied by the traverse-signal discriminating unit 4 is converted into a binary signal with the center value from the comparator 8 used as a threshold value in order to generate a mirror signal as an output. The mirror signal is used by a signal processing circuit and a tracking servo system not shown in the figure for, among other purposes, counting the number of tracks crossed by a light radiated by the optical pickup 3 and carrying out a pull-in operation of the tracking servo mechanism.

By the way, when the level of the playback signal output by the optical pickup 3 changes abruptly due to, for example, an injury on the optical disk 1 or other causes, the level of the traverse signal output by the traverse-signal discriminating unit 4 also changes abruptly, accompanying the abrupt change in playback-signal level as shown in FIG. 9. For the sake of convenience, such an abrupt change in playback-signal level due to an injury on the optical disk 1 or other causes is referred to hereafter simply as a defect of the playback signal.

Let a defect occur in the playback signal during a period in which a signal A shown in FIG. 9 is set at the H level. Assume that the defect causes the level of the traverse signal to abruptly drop, abruptly pulling down the bottom hold signal as well. Even if the playback signal is restored to a normal state later on, the bottom hold signal can not follow the traverse signal immediately. As a result, there arises a problem that an accurate mirror signal can not be obtained not only during the period of the defect occurring in the playback signal but also during a period following the defect period as shown by notation T in the figure.

The reason why that problem arises is explained as follows. In the hold circuit 5B for holding a bottom value of the traverse signal and also in the hold circuit 5A for holding a peak value of the traverse signal, normally, a capacitor is used for holding the traverse signal for a predetermined period of time. When a defect occurs in the playback signal, lowering the level of the traverse signal, the lowered level is held by the capacitor. In this way, once electric charge has been accumulated in the capacitor to represent the lowered level, it takes time to discharge the electric charge from the capacitor so that, even if the playback signal has been restored to a normal state, the bottom hold signal can not follow the traverse signal, that is, the bottom hold signal does not represent a lowest level of the traverse signal till the discharging of the capacitor is completed. As a result, a center-value signal, that is, a signal representing a variable intermediate value between the top hold and bottom hold signals or a signal representing a variable average value of the top hold and bottom hold signals, also does not represent center values of the traverse signal, giving rise to a problem that it is impossible to obtain an accurate mirror signal.

In addition, as described above, an accurate mirror signal can not be obtained not only during the period of the defect occurring in the playback signal at an injured portion of the optical disk 1 but also during a period following the defect period as shown by notation T in FIG. 9. As a result, the counted number of tracks crossed by a light radiated by the optical pickup 3 is also erroneous, making it take a long time to access a desired track.

In order to solve this problem, the discharge characteristic of the hold circuit 5B is improved by reducing the time constant of a circuit including the capacitor. In this way, electric charge accumulated in the capacitor to represent a low level held thereby can be discharged in a short period of time. If the time constant is too small, however, the voltage across the capacitor will follow changes in traverse signal with a low frequency, making it difficult to hold a bottom of the traverse signal.

Thus, by merely changing the time constant, it is difficult to obtain an accurate mirror signal rapidly while, at the same time, to hold the bottom of the traverse signal with a high degree of accuracy.

SUMMARY OF THE INVENTION

The present invention addresses the problems described above. It is thus an object of the present invention to provide a recording-medium driving apparatus and a recording-medium driving method which are capable of carrying out an operation to hold a bottom of a traverse signal normally as well as generating an accurate mirror signal in the event of a defect occurring in a playback signal.

According to a first aspect of the present invention, there is provided a recording-medium driving apparatus comprising:

a defect detecting means for detecting a defect occurring in a playback signal;

a hold means for holding a low-frequency component of the playback signal; and a reset means for resetting the hold means as requested by a signal output by the defect detecting means.

According to a second aspect of the present invention, there is provided a recording-medium driving method comprising the steps of:

detecting a defect occurring in a playback signal; and resetting a hold means for holding a low-frequency component of the playback signal in the event of a defect occurring in the playback signal.

In the recording-medium driving apparatus according to the first aspect of the present invention, the defect detecting means detects a defect occurring in a playback signal and, as requested by a signal output by the defect detecting means, a reset means resets a means for holding a low-frequency component of the playback signal.

In a recording-medium driving method according to a second aspect of the present invention, a defect occurring in a playback signal is detected and a hold means for holding a low-frequency component of the playback signal is reset in the event of a defect occurring in the playback signal.

DETAILED DESCRIPTION OF THE PREFERRED EMBODIMENTS

The present invention will become more apparent from a study of the following detailed description of preferred embodiments with reference to accompanying diagrams showing the embodiments.

Figure 1:
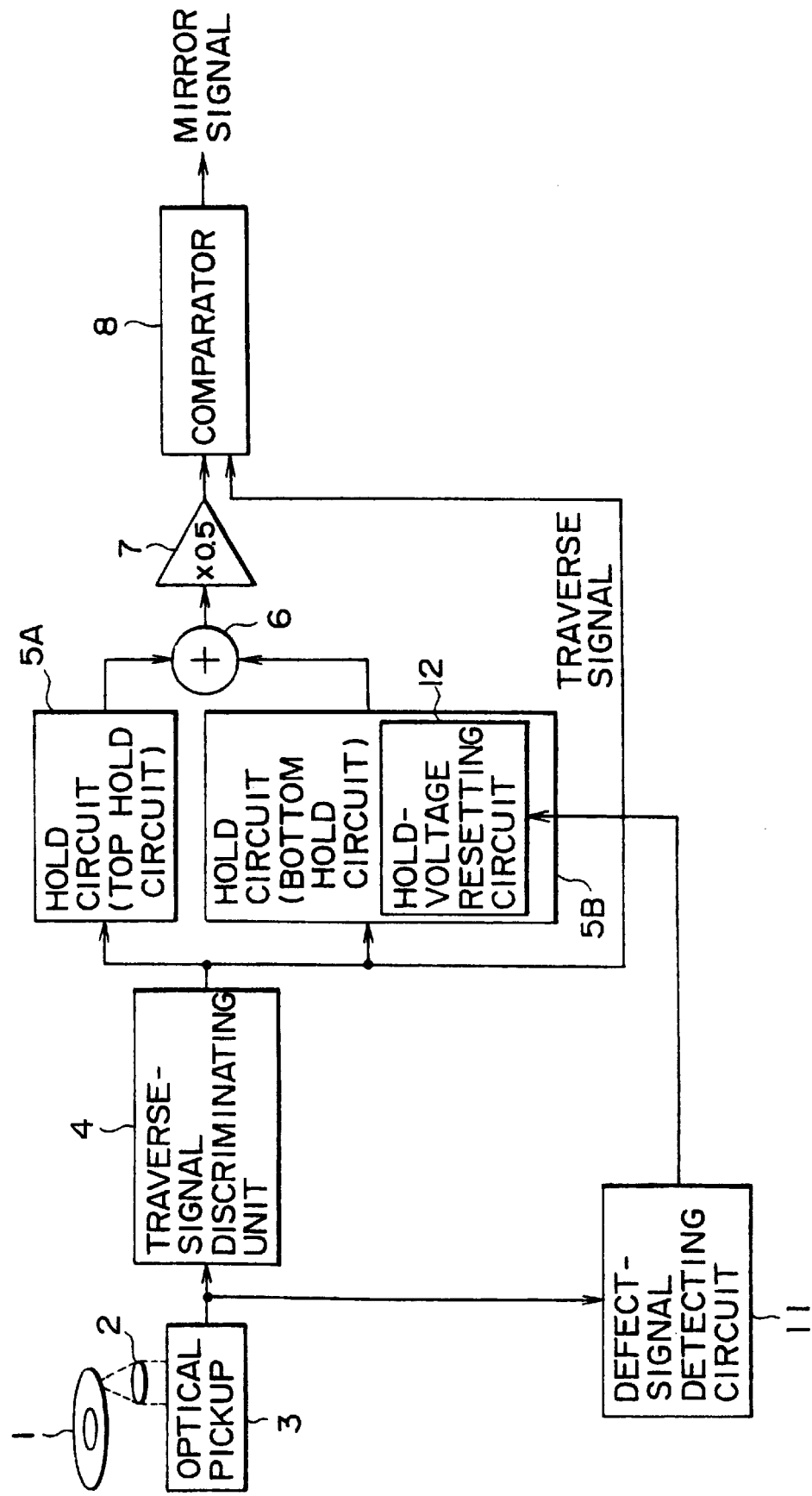
FIG. 1 is a block diagram showing the configuration of an embodiment implementing an optical-disk apparatus to which the present invention is applied.
Figure 8:
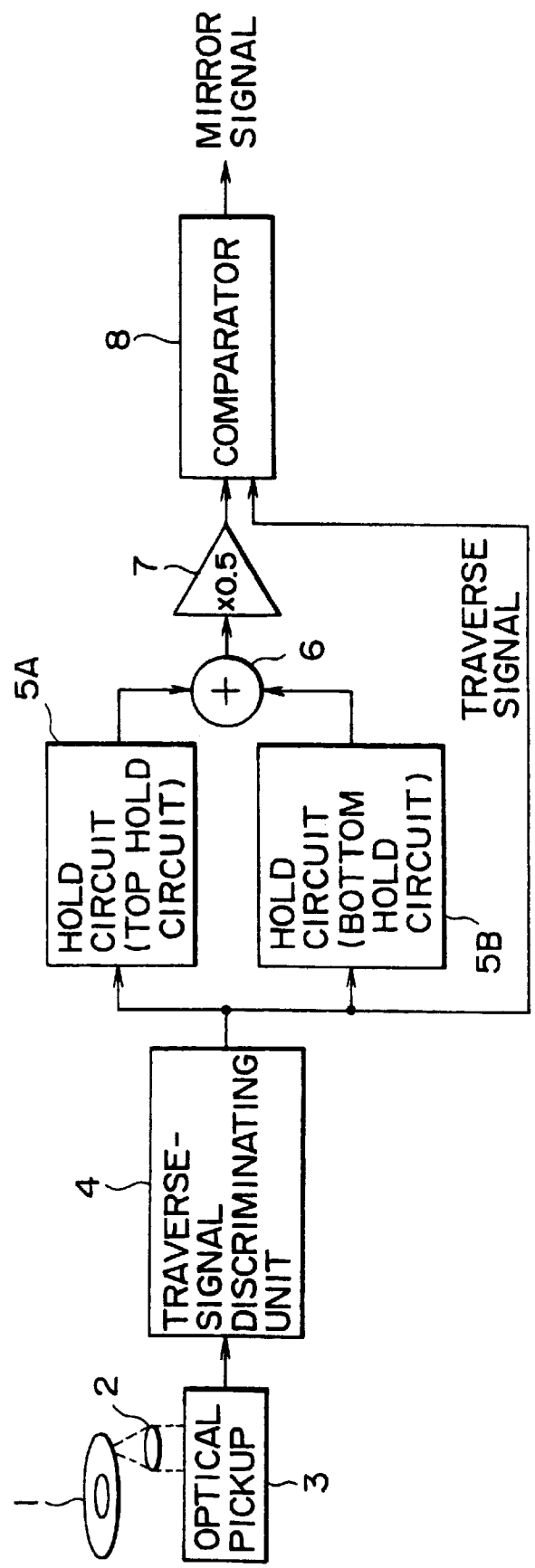
FIG. 8 is a block diagram showing the configuration of the conventional optical-disk apparatus.

FIG. 1 is a diagram showing the configuration of an embodiment implementing an optical-disk apparatus to which the present invention is applied. It should be noted that components identical with those shown in FIG. 8 are denoted by the same reference numerals as the corresponding components of FIG. 8 and their explanation is omitted for the sake of simplicity.

A playback signal is supplied by the optical pickup 3 to the defect detecting circuit 11, that is, the defect detecting means cited above. The defect detecting circuit 11 detects a defect that occurs in the playback signal, outputting a defect signal representing a result of the detection to the hold-voltage resetting circuit 12.

Figure 2:
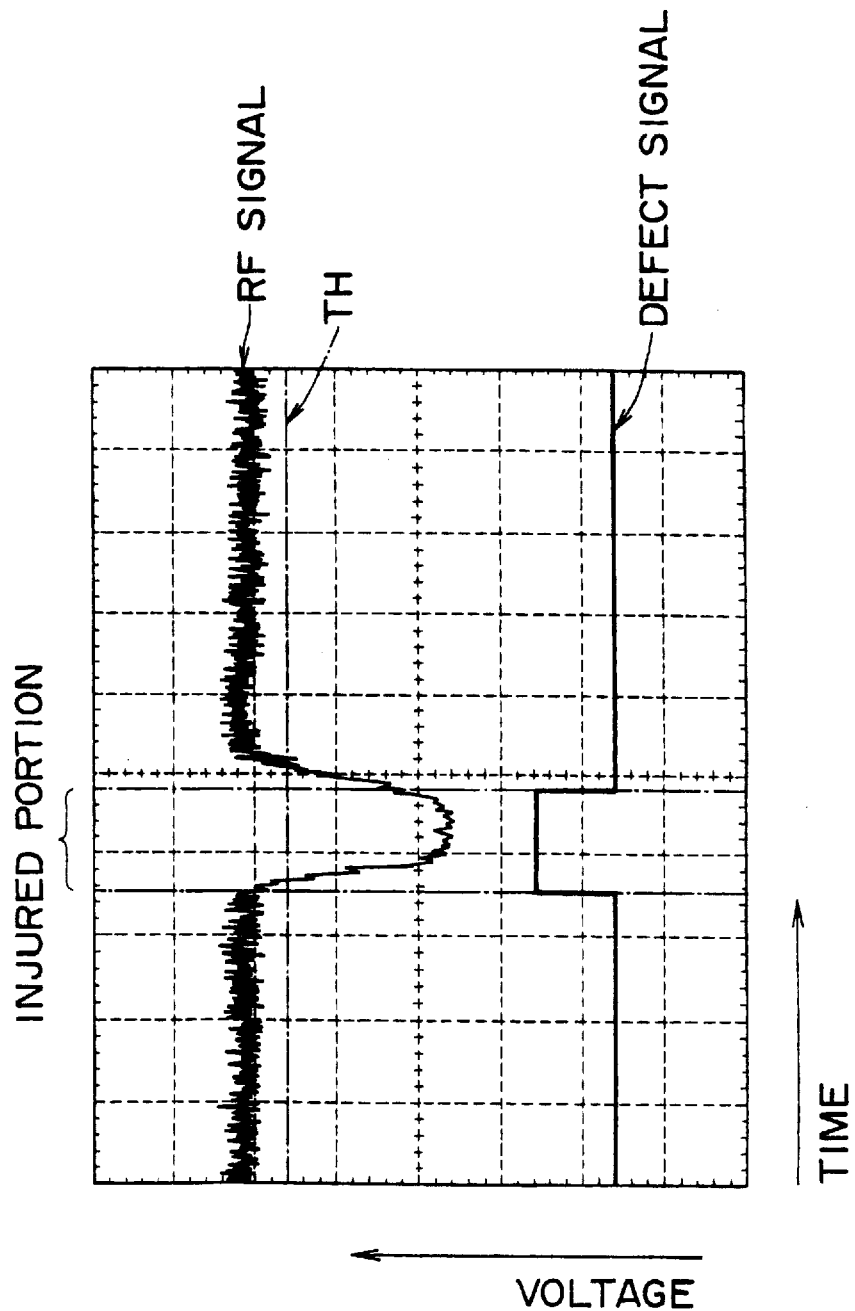
FIG. 2 is a waveform diagram used for explaining the processing carried out by a defect detecting circuit 11 employed in the optical-disk apparatus shown in FIG. 1.

The operation of the defect detecting circuit 11 is explained as follows. For example, if an injury exists on an optical disk 1, degrading the reflectance of the injured portion, the level of a playback signal (an RF signal) obtained from the injured portion is lowered as shown in FIG. 2. The defect detecting circuit 11 compares the playback signal with a predetermined threshold value TH. During a period in which the level of the playback signal is equal to or lower than the threshold value TH, the defect detecting circuit 11 outputs a defect signal at an H level as shown in the figure. During other periods, that is, during periods in which the level of the playback signal is higher than the threshold value TH, on the other hand, the defect detecting circuit 11 resets the defect signal to an L level.

Figure 3:
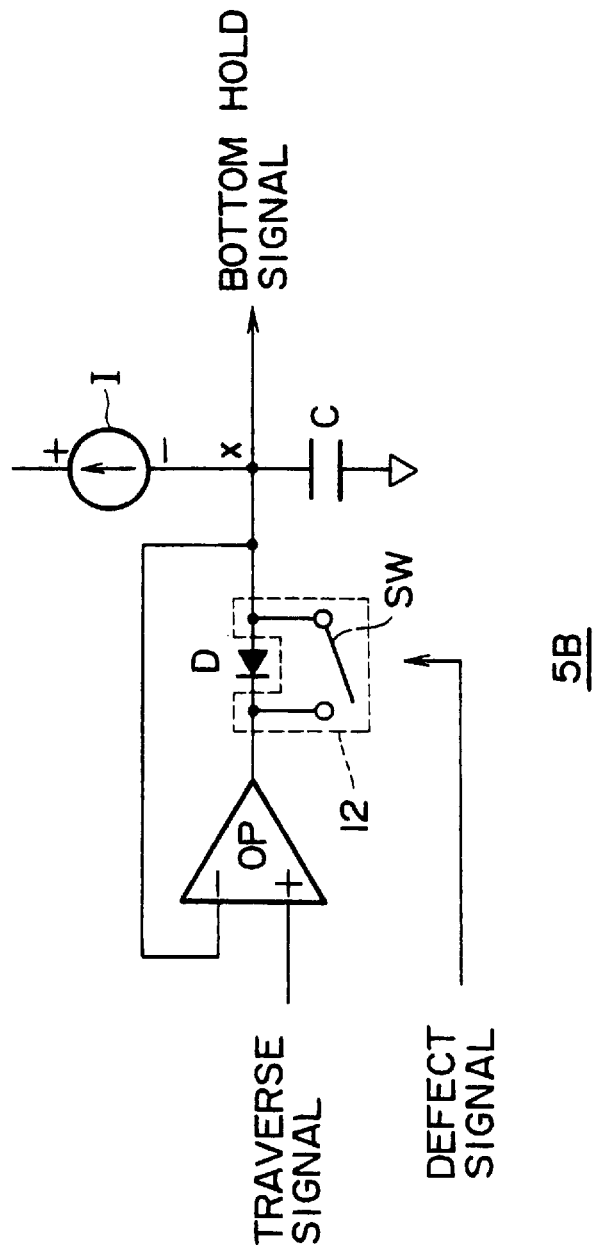
FIG. 3 is a diagram showing a typical configuration of a hold circuit 5B and a hold-voltage resetting circuit 12 employed in the optical-disk apparatus shown in FIG. 1.
Figure 5:
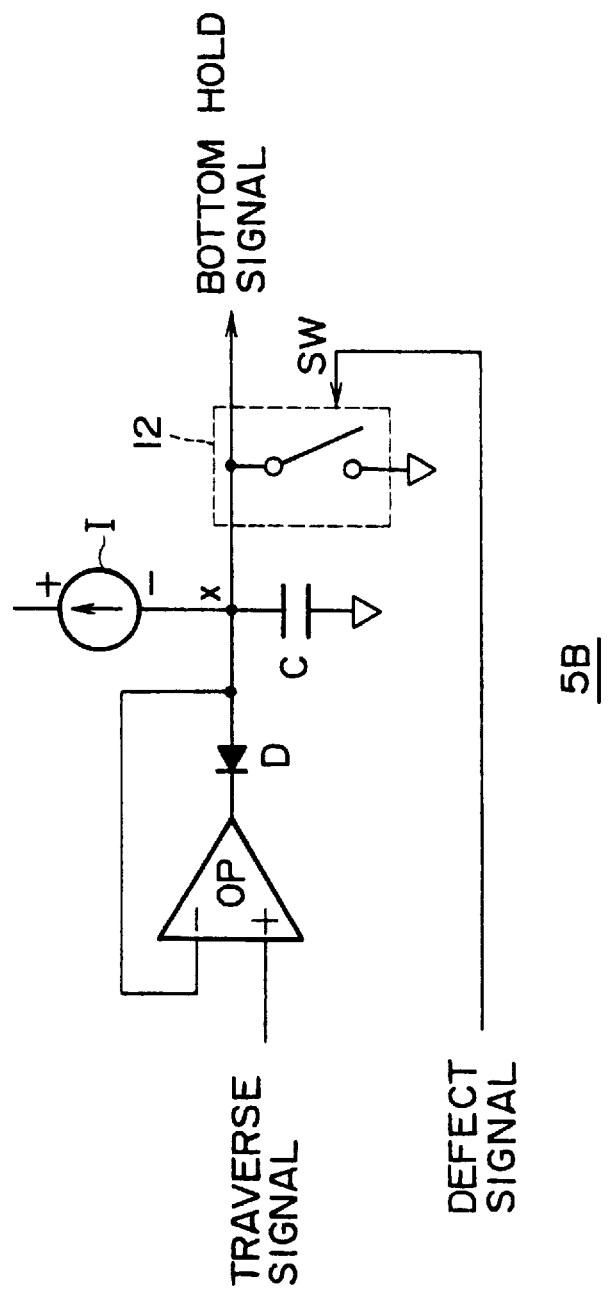
FIG. 5 is a diagram showing another typical configuration of a hold circuit 5B and a hold-voltage resetting circuit 12 employed in the optical-disk apparatus shown in FIG. 1.
Figure 6:
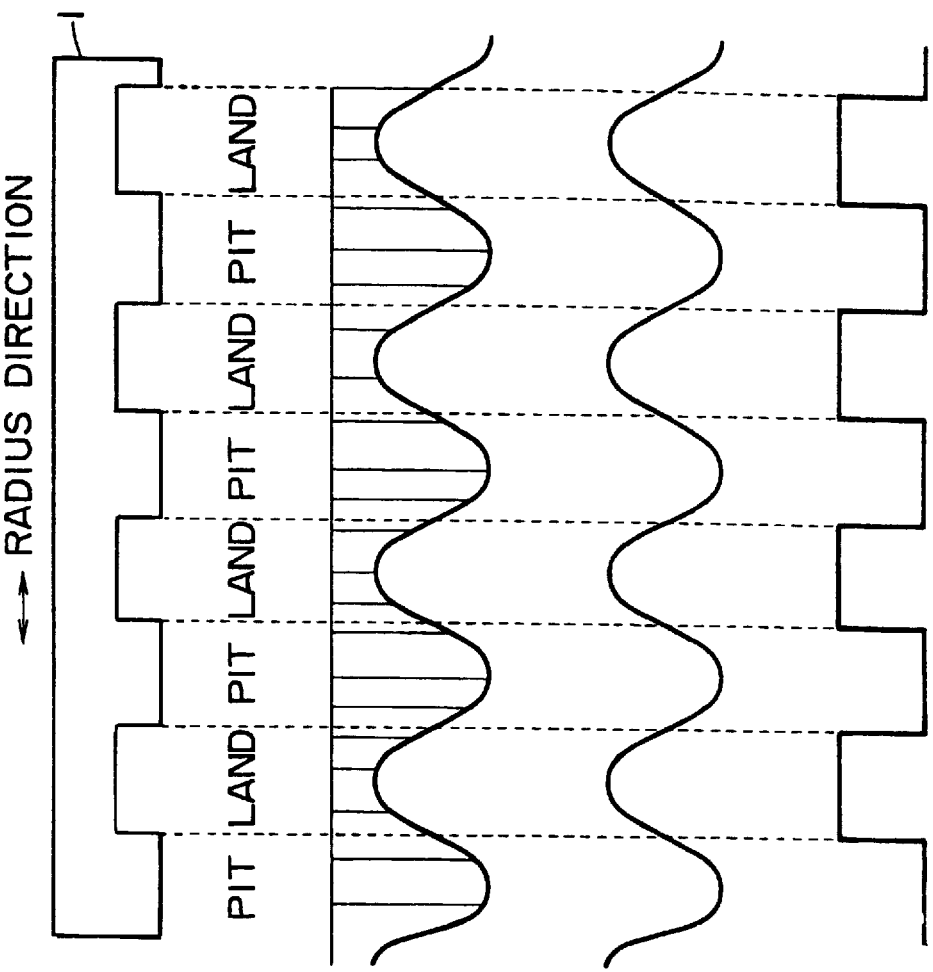
FIGS. 6A to 6D are diagrams used for explaining a process of generating a mirror signal.
Figure 7:
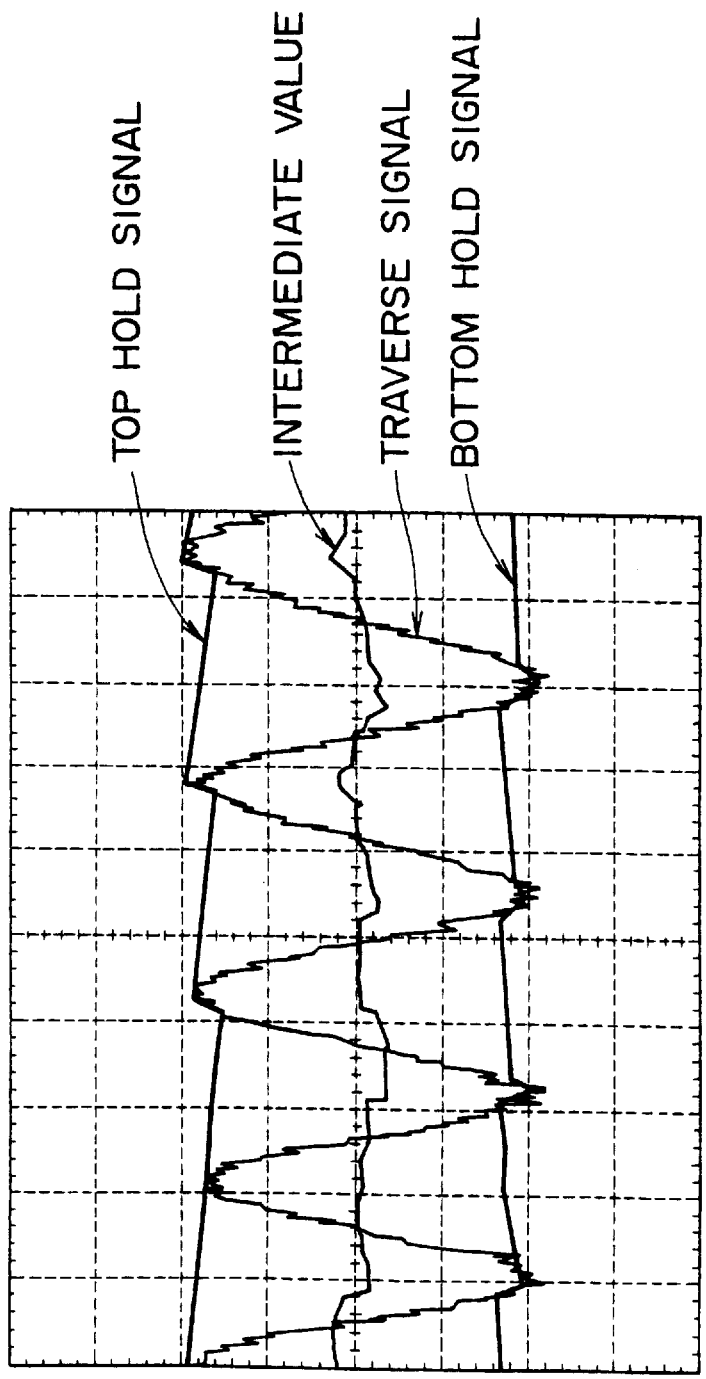
FIG. 7 is a waveform diagram used for explaining a technique for finding an intermediate value.

Receiving the defect signal set at the H level from the defect detecting circuit 11, the hold-signal resetting circuit 12 (that is, the reset means cited earlier) resets the hold circuit 5B as long as the defect signal is set at the H level. As shown in FIGS. 3 and 5, the hold circuit 5B has a capacitor C which will be described later. The hold-voltage resetting circuit 12 resets the hold circuit 5B typically by discharging the capacitor C.

In the optical-disk apparatus with a configuration described above, the mirror signal is generated in the same way as the optical-disk apparatus shown in FIG. 8. To put it in detail, a laser beam emitted by the optical pickup (or a playback means) 3 is radiated to the optical disk 1 by way of the object lens 2. At the optical disk 1, the laser beam is reflected and the reflected light is transmitted back to the optical pickup 3 through the object lens 2. The optical pickup 3 converts the reflected light coming from the optical disk 1 in an opto-electrical conversion process into an electrical signal. Serving as a playback signal, the electrical signal is output to the traverse-signal discriminating unit (or a low-frequency-component detecting means) 4 and the defect detecting circuit 11. In the traverse-signal discriminating unit 4, a traverse signal is separated (or detected) from the playback signal supplied by the optical pickup 3 and output to the hold circuit 5A (or a top hold mean or simply a hold mean), the hold circuit 5B (or a bottom hold mean or simply a hold mean) as well as to the comparator 8. At the hold circuits 5A and 5B, peak and bottom values of the traverse signal are held to generate a top hold signal and a bottom hold signal respectively which are then supplied to the adder 6. The adder 6 adds the top hold signal to the bottom hold signal, supplying the sum to the multiplier 7. The multiplier 7 multiplies the sum output by the adder 6 by ½ to produce a center value of the traverse signal which are output to the comparator 8. At the comparator 8, the traverse signal supplied by the traverse-signal discriminating unit 4 is converted into a binary signal with the center value from the comparator 8 used as a threshold value in order to generate a mirror signal as an output.

In the defect detecting circuit 11, in the mean time, the playback signal supplied by the optical pickup 3 is checked for a defect. If a defect is detected, a defect signal is supplied to the hold-voltage resetting circuit 12 at the H level. The hold-voltage resetting circuit 12 resets the hold circuit 5B as long as the defect signal is set at the H level.

FIG. 3 is a diagram showing a typical configuration of the hold circuit 5B and the hold-voltage resetting circuit 12. As shown in the figure, the hold circuit 5B comprises an operational amplifier OP, a diode D, a current source I and a capacitor C whereas the hold-voltage resetting circuit 12 is implemented merely by a switch SW.

The traverse signal is supplied to the non-inverted input terminal of the operational amplifier OP. The output of the operational amplifier OP is connected to the anode of the diode D. On the other hand, the cathode of the diode D is connected one terminal of the capacitor C. The other terminal of the capacitor is connected to something with a low impedance such as the ground. A connection point x between the diode D and the capacitor C is connected to the inverted input terminal of the operational amplifier OP and one terminal of the current source I. It should be noted that the voltage at the connection point x between the diode D and the capacitor C is output as the bottom hold signal.

The switch SW is connected in parallel to the diode D so that, when the switch SW is closed, the diode D is shorted. When the defect signal is reset or set to the L or H level, the switch SW is turned off (or opened) or turned on (closed) respectively.

In the hold circuit 5B and the hold-voltage resetting circuit 12 with a configuration described above, an alternating-current voltage corresponding to the transverse signal supplied to the non-inverted input terminal of the operational amplifier OP appears at the output terminal of the operational amplifier OP. The positive component of the alternating-current voltage (that is, the component in the amplifying direction) is blocked by the diode D. In other words, only the negative component of the alternating-current voltage can pass through the diode D. As a result, the lowest voltage of the negative component passing through the diode D is held by the capacitor C. That is to say, the bottom of the traverse signal is held by the capacitor C.

It should be noted that the hold time of the capacitor C can be set by a charging time of the capacitor C which is determined by a current flowing from the current source I. In addition, the hold circuit 5B with a configuration shown in FIG. 3 has a time constant which changes with the operating voltage as is generally known. This characteristic also holds true of a hold circuit shown in FIG. 5 to be described later.

Figure 4:
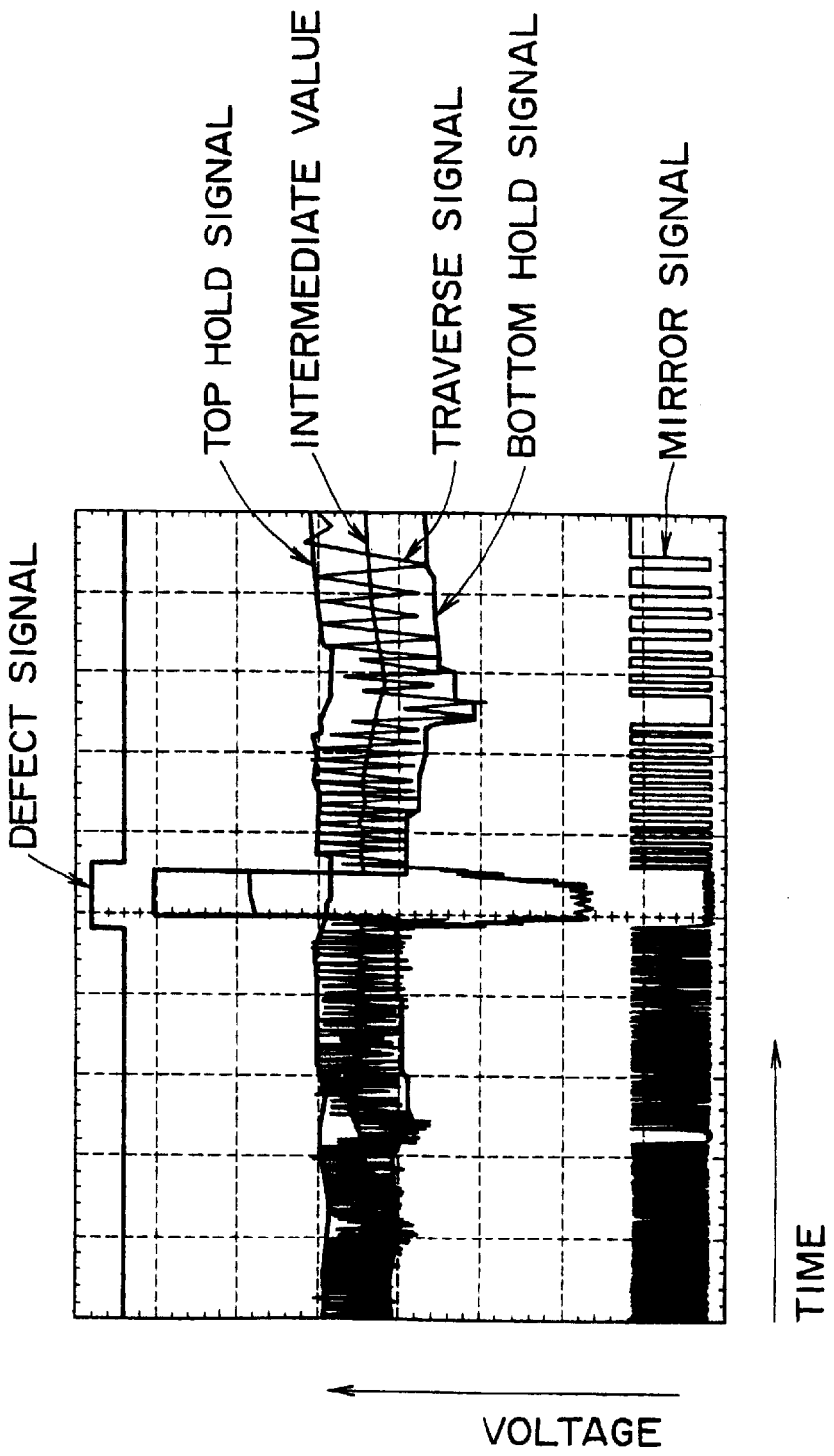
FIG. 4 is a waveform diagram used for explaining the operation carried out by the hold circuit 5B and a hold-voltage resetting circuit 12 shown in FIG. 3.

When the defect signal is reset at the L level, the switch SW is turned off. In this state, the bottom of the traverse signal is held. If a defect occurs in the playback signal, however, the level of the traverses signal abruptly drops as shown in FIG. 4, raising the defect signal to the H level which turns on the switch SW. With the switch SW turned on, electric charge accumulated in the capacitor C is discharged or the hold circuit 5B is reset.

To put it in detail, when the switch SW is turned on, the diode D is shorted. In this state, a current can flow through the switch SW, bringing the voltage at the connection point x of the capacitor C to the output terminal of the operational amplifier OP. That is to say, the current output by the operational amplifier OP flows to the capacitor C. As a result, the capacitor C is discharged or reset.

For this reason, while the defect signal is set at the H level, no bottom is held by the hold circuit 5B. The signal output by the hold circuit 5B, that is, the bottom hold signal, is held at a predetermined level as enclosed by a dotted line in the figure.

As the defect signal is reset back to the L level later on, the switch SW is turned off. In this state, the bottom value of the traverse signal is again held as described earlier. In this case, immediately after the defect signal is reset to the L level, the capacitor C is in a discharged state. As a result, the hold circuit 5B can immediately output a bottom hold signal that follows the traverse signal or, strictly speaking, the lowest level of the traverse signal with a high degree of accuracy as shown in FIG. 4.

Figure 9:
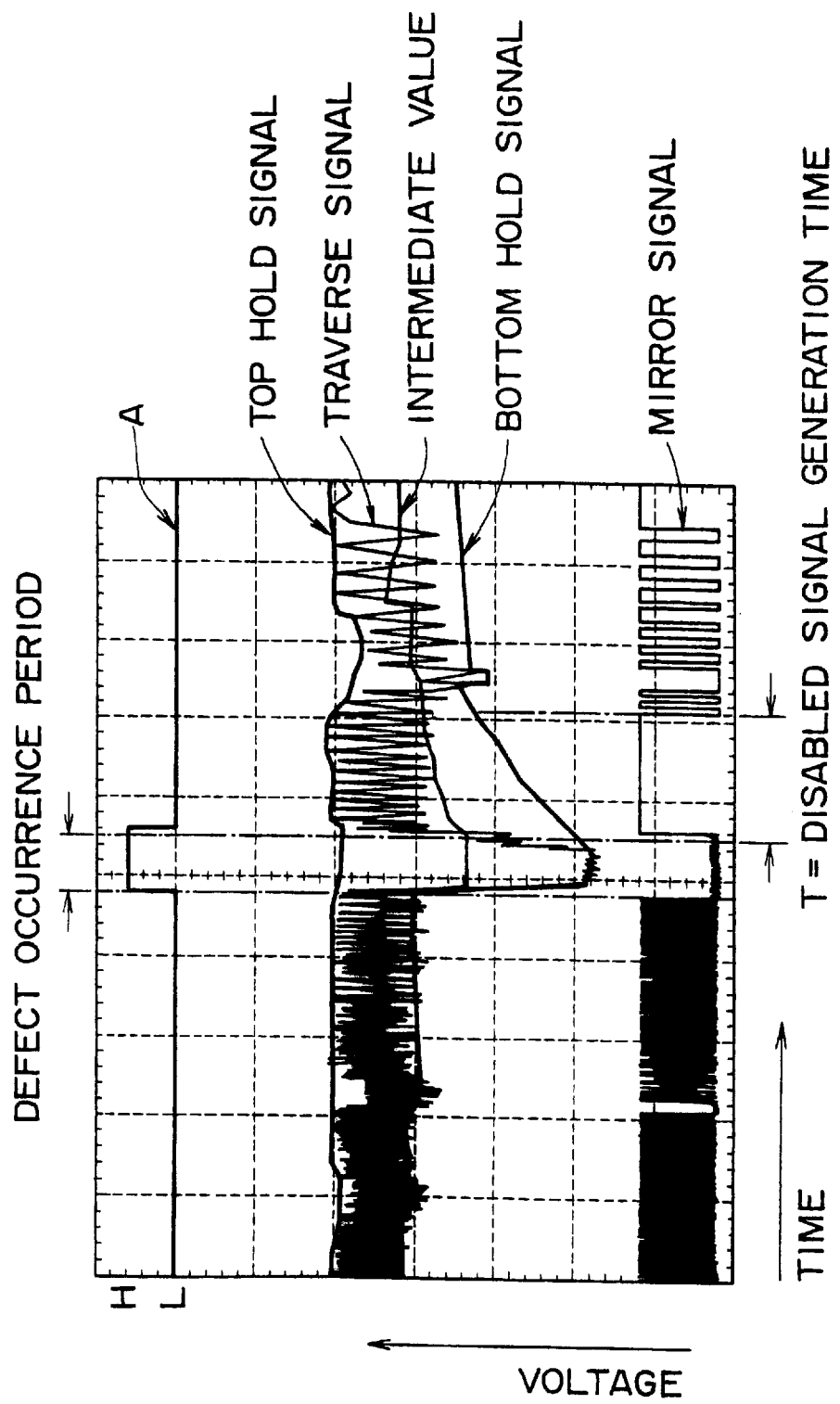
FIG. 9 is a diagram used for explaining the waveforms of a traverse signal, a bottom hold signal intermediate-value signal and a mirror signal obtained in the even of a defect occurring in the playback signal.

Accordingly, unlike the case in which an accurate mirror signal can not be obtained not only during the period of a defect occurring in the playback signal at an injured portion of the optical disk 1 but also during a predetermined period T following the defect period as shown in FIG. 9, an accurate intermediate value of the traverse signal and, thus, a mirror signal can be obtained immediately after the defect of the playback signal disappears as shown in FIG. 4. As a result, since an erroneous track count is obtained only for an injured portion or the like of the optical disk 1, a desired track can be accessed at a high speed in comparison with the conventional recording-medium driving apparatus.

FIG. 5 is a diagram showing another typical configuration of the hold circuit 5B and the hold-voltage resetting circuit 12. It should be noted that components identical with those shown in FIG. 3 are denoted by the same reference numerals as the corresponding components of FIG. 3 and their explanation is omitted for the sake of simplicity. As shown in FIG. 5, the hold circuit 5B and the hold-voltage resetting circuit 12 are the same as those shown in FIG. 3 except that the switch SW for shorting the diode D in the latter is now used for shorting the capacitor C in the former.

As shown in FIG. 5, one terminal of the switch SW is connected to a thing with a low impedance such as the ground (connected to a low-impedance power supply) as is the case with the capacitor C. On the other hand, the other terminal of the switch SW is connected to the connection point x between the diode D and the capacitor C.

Much like the switch SW shown in FIG. 3, this switch SW is turned on or off when the defect signal is reset or set to the L or H level respectively. Therefore, when a defect occurs in the playback signal, turning on the switch SW, both the terminals of the capacitor C are connected forcibly to the ground or the like through the switch SW. As a result, electric charge accumulated in the capacitor C is discharged or the hold circuit 5B is reset.

For this reason, while the defect signal is set at the H level, no bottom is held by the hold circuit 5B. The signal output by the hold circuit 5B, that is, the bottom hold signal, is held at the 0 level. It should be noted that the bottom hold signal is observed by taking as a reference the potential of a low-impedance thing such as the ground to which one terminal of the switch SW is connected.

As the defect signal is reset back to the L level later on, the switch SW is turned off as is the case with the hold circuit 5B and the hold-voltage resetting circuit 12 shown in FIG. 3. In this state, the bottom value of the traverse signal is again held as described earlier. In this case, immediately after the defect signal is reset to the L level, the capacitor is in a discharged state. As a result, the hold circuit 5B can immediately output a bottom hold signal that follows the traverse signal or, strictly speaking, the lowest level of the traverse signal with a high degree of accuracy.

The present invention has been described with an application to the optical-disk apparatus taken as an example. It should be noted, however, that the scope of the present invention is not limited to an optical disk. The present invention can also be applied to an apparatus for recording and playing back information to and from other recording media such as an optical magnetic disk and an optical card.

It is also worth noting that, while the present invention has been described with reference to the illustrative embodiments, the description is not intended to be construed in a limiting sense. That is to say, it is to be understood that the subject matter encompassed by the present invention is not limited to the embodiment. A variety of changes and modifications of the embodiment will be apparent to the persons skilled in the art upon a study of the description. For example, in the embodiment, in order to reset the hold circuit 5B, the hold-voltage reset circuit 12 is provided only in the hold circuit 5B which is used for holding the bottom of the traverse signal. It should be noted that a hold-voltage reset circuit 12 can also be provided in the hold circuit 5A as well for the resetting purpose. In the case of the hold circuit 5A, however, the diode D and the current source I are each connected with a polarity thereof opposite to those shown in FIGS. 3 and 5.

In addition, in the embodiment described above, the capacitor C employed in the hold circuit 5B is forcibly discharged when a defect is detected in the playback signal. As an alternative, for example, immediately before the defect signal-is set to the H level, the charged state of the capacitor is sustained as it is by using some methods. As the defect signal is reset to the L level, the operation to hold a bottom is resumed from the sustained charged state.

In addition, the configuration of the hold circuit 5B and the hold-voltage resetting circuit 12 are not limited to those shown in FIGS. 3 and 5. That is to say, a variety of configurations are possible for the hold-voltage resetting circuit 12 depending upon the hold circuit 5B. In general, one adopts a configuration which allows the electrical connection of one terminal of the capacitor C composing the hold circuit 5B to be switched to a thing with a low impedance.

With the recording-medium driving apparatus and the recording-medium driving method according to the present invention, a playback signal is checked for a defect. If a defect is detected, a hold means for holding a low-frequency component of the playback signal is reset. As a result, when a defect occurs in the playback signal and then disappears later on, for example, a signal resulting from conversion of the low-frequency signal into a binary signal can be obtained immediately after the defect has gone.

What is claimed is:

1. A recording-medium driving apparatus for driving a recording medium, said apparatus comprising:
   a playback means for reproducing a playback signal from said recording medium;
   a low-frequency-component detecting means for detecting a low-frequency component out of said playback signal;
   a hold means for holding said low-frequency component;
   a binary conversion means for converting said low-frequency component by using a signal output by said hold means into a binary signal;
   a defect detecting means for detecting a defect in said playback signal; and
   a reset means for resetting said hold means in response to a signal output by said defect detecting means.

2. A recording-medium driving apparatus for driving a recording medium according to claim 1 wherein said hold means comprises a top hold means for holding a peak of said low-frequency component and a bottom hold means for holding a bottom of said low-frequency component whereas said reset means resets at least one of said top and bottom hold means.

3. A recording-medium driving apparatus for driving a recording medium according to claim 2 wherein said reset means resets said bottom hold means.

4. A recording-medium driving apparatus for driving a recording medium according to claim 2 wherein said reset means resets said top hold means.

5. A recording-medium driving apparatus for driving a recording medium according to claim 2 wherein said hold means comprises:
   an amplifier with a non-inverted input terminal thereof receiving said low-frequency component;
   a diode with the anode thereof connected to the output terminal of said amplifier and the cathode thereof connected to an inverted input terminal of said amplifier;
   a capacitor with one terminal thereof made a low impedance and the other terminal thereof connected to said cathode of said diode; and
   a current source connected to said cathode of said diode.

6. A recording-medium driving apparatus for driving a recording medium according to claim 5 wherein said reset means shorts said diode in response to said signal output by said defect detecting means.

7. A recording-medium driving apparatus for driving a recording medium according to claim 5 wherein said reset means includes a means for connecting said other terminal of said capacitor to the ground in response to said signal output by said defect detecting means.

8. A recording-medium driving apparatus for driving a recording medium according to claim 1 wherein said recording medium is an optical disk.

9. A recording-medium driving method adopted in a recording-medium driving apparatus comprising:
   a playback means for reproducing a playback signal from said recording medium;
   a low-frequency-component detecting means for detecting a low-frequency component out of said playback signal;
   a hold means for holding said low-frequency component; and
   a binary conversion means for converting said low-frequency component by using a signal output by said hold means into a binary signal,
   said recording-medium driving method comprising the steps of:
      detecting a defect in said playback signal; and
      resetting said hold means in the event of a defect occurring in said playback signal.

* * * * *